United States Patent
Ragazzini

(10) Patent No.: US 9,796,273 B2
(45) Date of Patent: Oct. 24, 2017

(54) FEED SYSTEM IN A LYOPHILIZATION MACHINE FOR THE PHARMACEUTICAL SECTOR

(71) Applicant: I.M.A. INDUSTRIA MACCHINE AUTOMATICHE S.P.A., Ozzano Dell'Emilia (IT)

(72) Inventor: Ivan Ragazzini, Imola (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 0 days.

(21) Appl. No.: 14/899,526

(22) PCT Filed: May 23, 2014

(86) PCT No.: PCT/IB2014/061664
§ 371 (c)(1),
(2) Date: Dec. 17, 2015

(87) PCT Pub. No.: WO2014/203098
PCT Pub. Date: Dec. 24, 2014

(65) Prior Publication Data
US 2016/0152141 A1 Jun. 2, 2016

(30) Foreign Application Priority Data

Jun. 19, 2013 (IT) .............................. MI2013A1016

(51) Int. Cl.
*F26B 5/06* (2006.01)
*B60L 5/00* (2006.01)
(Continued)

(52) U.S. Cl.
CPC ............... *B60L 5/005* (2013.01); *B60M 7/00* (2013.01); *B65G 25/08* (2013.01); *F26B 5/06* (2013.01); *F26B 25/003* (2013.01)

(58) Field of Classification Search
CPC .......... F26B 5/06; F26B 25/003; B60L 5/005; B60M 7/00; B65G 25/08
(Continued)

(56) References Cited

U.S. PATENT DOCUMENTS 3,132,930 A * 5/1964 Abbott ...................... A23L 3/44
104/35
3,192,645 A * 7/1965 Oetjon .................... F26B 5/042
104/138.1
(Continued)

FOREIGN PATENT DOCUMENTS

DE   EP 1712859 A2 * 10/2006 ................ F26B 5/06
IT   WO 2014188375 A1 * 11/2014 ................ F26B 5/06
(Continued)

OTHER PUBLICATIONS

Search Report and Written Opinion for PCT/IB2014/061664, dated Aug. 19, 2014.

*Primary Examiner* — Stephen M Gravini
(74) *Attorney, Agent, or Firm* — Marshall, Gerstein & Borun LLP

(57) ABSTRACT

Feed system provided with feed means located inside a lyophilization chamber and able at least to supply electric energy to a slider, autonomously mobile at least inside the lyophilization chamber, and to the possible other internal components which need the energy present in or associated to the slider. The feed means are positioned along the travel of the slider and cooperate with energy receiver means associated to the slider, being static at least during the loading and unloading steps of at least a loading plane.

18 Claims, 5 Drawing Sheets

(51) Int. Cl.
*F26B 25/00* (2006.01)
*B60M 7/00* (2006.01)
*B65G 25/08* (2006.01)

(58) Field of Classification Search
USPC .......................................................... 34/92
See application file for complete search history.

(56) References Cited

U.S. PATENT DOCUMENTS

| | | | |
|---|---|---|---|
| 3,234,661 A | 2/1966 | Nerge | |
| 3,469,327 A * | 9/1969 | Catelli | A23L 3/44 34/236 |
| 5,129,162 A * | 7/1992 | Hemmersbach | B65G 65/00 34/217 |
| 5,477,663 A * | 12/1995 | Smith | B65B 5/08 53/244 |
| 6,354,091 B1 * | 3/2002 | Hemmes | B01J 2/06 62/64 |
| 6,499,701 B1 * | 12/2002 | Thornton | B60L 5/005 246/1 C |
| 7,343,696 B2 * | 3/2008 | Covert | F26B 5/06 34/92 |
| 8,197,171 B2 * | 6/2012 | Wagner | F26B 5/06 34/236 |
| 8,513,849 B2 * | 8/2013 | Epstein | H02K 53/00 310/156.43 |
| 8,820,516 B2 * | 9/2014 | Christ | F26B 5/06 198/747 |
| 9,546,818 B2 * | 1/2017 | Trebbi | F26B 5/06 |
| 2012/0186947 A1 | 7/2012 | Christ | |
| 2015/0013825 A1 * | 1/2015 | Trebbi | F04B 43/1261 141/1 |
| 2016/0152141 A1 * | 6/2016 | Ragazzini | F26B 5/06 414/222.01 |

FOREIGN PATENT DOCUMENTS

| | | | |
|---|---|---|---|
| IT | WO 2014203098 A1 * | 12/2014 | F26B 5/06 |
| NL | WO 2011015453 A8 * | 3/2011 | F26B 5/06 |

* cited by examiner

US 9,796,273 B2

FEED SYSTEM IN A LYOPHILIZATION MACHINE FOR THE PHARMACEUTICAL SECTOR

FIELD OF THE INVENTION

The present invention concerns an energy feed system inside a lyophilization machine for the pharmaceutical sector and for similar sectors.

The present invention also concerns a lyophilization machine adopting this system and having a slider that feeds and/or unloads containers which cooperates with the inside of the lyophilization machine at least for a determinate period of time. The present invention also concerns a slider that feeds and/or unloads containers inside a lyophilization chamber fed with the system according to the invention.

BACKGROUND OF THE INVENTION

It is known that in the pharmaceutical sector and similar sectors such as foodstuffs and para-pharmaceutical products it is often provided to lyophilize the products in order to improve their preservation and life.

It is also known that in a lyophilization chamber, no dust must be created, there must be no sources delivering magnetic forces and everything must be simplified, with no emissions of vapors or disallowed substances. All this to facilitate cleaning and at the same time to prevent contaminants from coming into contact with the product to be lyophilized or already lyophilized.

It is also known to provide that there is normally a plurality of planes in a lyophilization chamber which are loaded on each occasion with containers of the products to be lyophilized, which are then unloaded when the lyophilization cycle is terminated.

It is also known that the loading and unloading operation takes place by means of various systems, in this case loading and/or unloading using sliders of various types, shape and composition.

The sliders can have on board the means to move them and possibly means to feed the movement means, and also possible command and control means, autonomous or remote controlled.

The power needed to feed the movement means of the sliders, and the loading-unloading arm if present, is currently supplied either by mechanical cables or electric cables, or by energy accumulation means on board; the accumulation means can accumulate electric, fluid or mechanical energy. These power feed means all generate dust or fumes or toxic gases, or magnetic forces, even intense, all of which is contraindicated in the various pharmaceutical formulas that are then subjected to lyophilization. Furthermore, the power feed means are bulky, costly and create problems in cleaning and maintenance and also, on certain occasions, the danger of explosions.

In the case of energy accumulation means on board, whether they are electrical, fluid or mechanical accumulators, there is the problem of recharging them, which complicates the system, increases production and management costs, requires a storehouse for spare parts and creates problems in producing the whole system.

With regard to the command and control system, this can be interfaced with a central unit or other specific unit, by means of cables or without cables, for example by means of Wi-Fi, Bluetooth, Zigbee, radio waves in general or other systems. These dialog means create disturbances that certain substances, in particular but not only pharmaceutical, should not have to support.

Document US-A-2012/0186947 describes a device for loading/unloading vertically mobile loading planes of a drying chamber of a lyophilization machine. The device provides a slider that is mobile during the loading/unloading operations, which forms a mobile guide edge for the containers to be treated, and longitudinal guides that define lateral fixed guides for the containers to be treated, provided on each of the loading planes and hence mobile therewith. The slider is driven by two linear motors provided with respective primary parts, which are connected fixed to both sides of the mobile slider, and hence mobile therewith, and are supported by the longitudinal guides, which in turn receive secondary parts of the linear motors. The supply of electrical power of the two linear motors occurs by means of a feed line or a group of feed lines connected to the two primary parts mobile with the slider. Consequently, the feed system described in US-A-2012/0186947 can be bulky and complex, since it provides that the feed means, that is, the primary parts of the linear motors, which drive the slider are mobile therewith and connected to feed lines which consequently are also mobile. The presence of energy feed parts that are mobile with the slider, in particular during the loading/unloading steps, is not desired in the lyophilization machines under discussion here.

One purpose of the present invention is to obtain an energy feed system that simplifies the movements of the sliders inside the lyophilization chamber, facilitates maintenance and cleaning operations, at the same time keeping costs low, both production, maintenance and management costs.

Another purpose is to supply, inside the lyophilization chamber, at least the energy needed to make at least the slider function for a determinate period of time.

Another purpose of the present invention is to obtain an interface with command and/or control systems outside the lyophilization chamber, which reduces interference and disturbances for the substances subjected to lyophilization.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, an energy feed system, in particular electric energy, inside a lyophilization machine, according to the present invention overcomes the limits of the state of the art and eliminates the defects therein. The energy feed system provides that the means that supply the energy, advantageously electric energy, also called feed means, at least to the slider, are positioned static along the travel of the slider and cooperate with energy receiver means which are associated to the slider.

According to one form of embodiment, a communication system can be provided, configured for the two-way transmission and reception of data or information with the slider and at least partly fed by the feed means.

According to a first formulation of the present invention, the feed means are at least one of the pathways along which the slider moves.

According to a first variant, at least one of the feed means is associated to, but insulated from, at least one pathway.

According to another variant, at least one of the feed means is disposed parallel to at least one pathway.

It is another variant to use as feed means a magnetic source which comprises at least a fixed magnetic induction coil, suitable to induce the desired electric energy on an induced coil associated to the slider.

The invention provides that at least when the door of the lyophilization chamber is closed, the feed means that supply the electric energy to the slider are intercepted and therefore without energy.

According to a first formulation, the energy feed means are continuous, that is, they develop without a break in continuity.

According to a variant the energy feed means consist of a plurality of elements disposed consecutive with respect to each other.

According to another variant the feed means have a reduced flat horizontal surface in order to prevent dust from forming or being deposited.

It is within the spirit of the invention to convey the instructions for a management and control system located on board the slider, through at least one of the feed means which supply the electric energy.

A variant of this solution is that the management and control system located on board the slider acts in feedback with an external system or command and control unit through the feed means themselves, or through another mean which could also be a supplier of electric energy.

It is within the spirit of the invention to provide that on board the slider there is at least one motor to which wheels or tracks are associated, suitable to allow the movement of the slider.

It is a variant to provide, on board the slider, a motor mean that drives the bar that moves the bottles/vials to be inserted into and extracted from the lyophilization chamber. The motor mean can be a rotating motor, a magnetic suction device, an electric screw jack.

It is also a variant to provide that on board the slider there is a battery, for example for emergencies and/or for heating parts of the slider which can be affected by the low temperature in the lyophilization chamber (−50° or even −60° or more) when the bottles/vials have to be extracted.

It is within the spirit of the invention to provide that the battery or batteries on board the slider can also drive the motor/motors which serve to make the slider itself function.

The energy supplied to the slider can be that which the slider will then use directly, or an energy with a greater or lesser tension. In the latter case, as well as the transformation to feed the management and control systems, a transformation to feed the motor means can also take place.

BRIEF DESCRIPTION OF THE DRAWINGS

These and other characteristics of the present invention will become apparent from the following description of some forms of embodiment, given as a non-restrictive example with reference to the attached drawings wherein.

Figure 1:
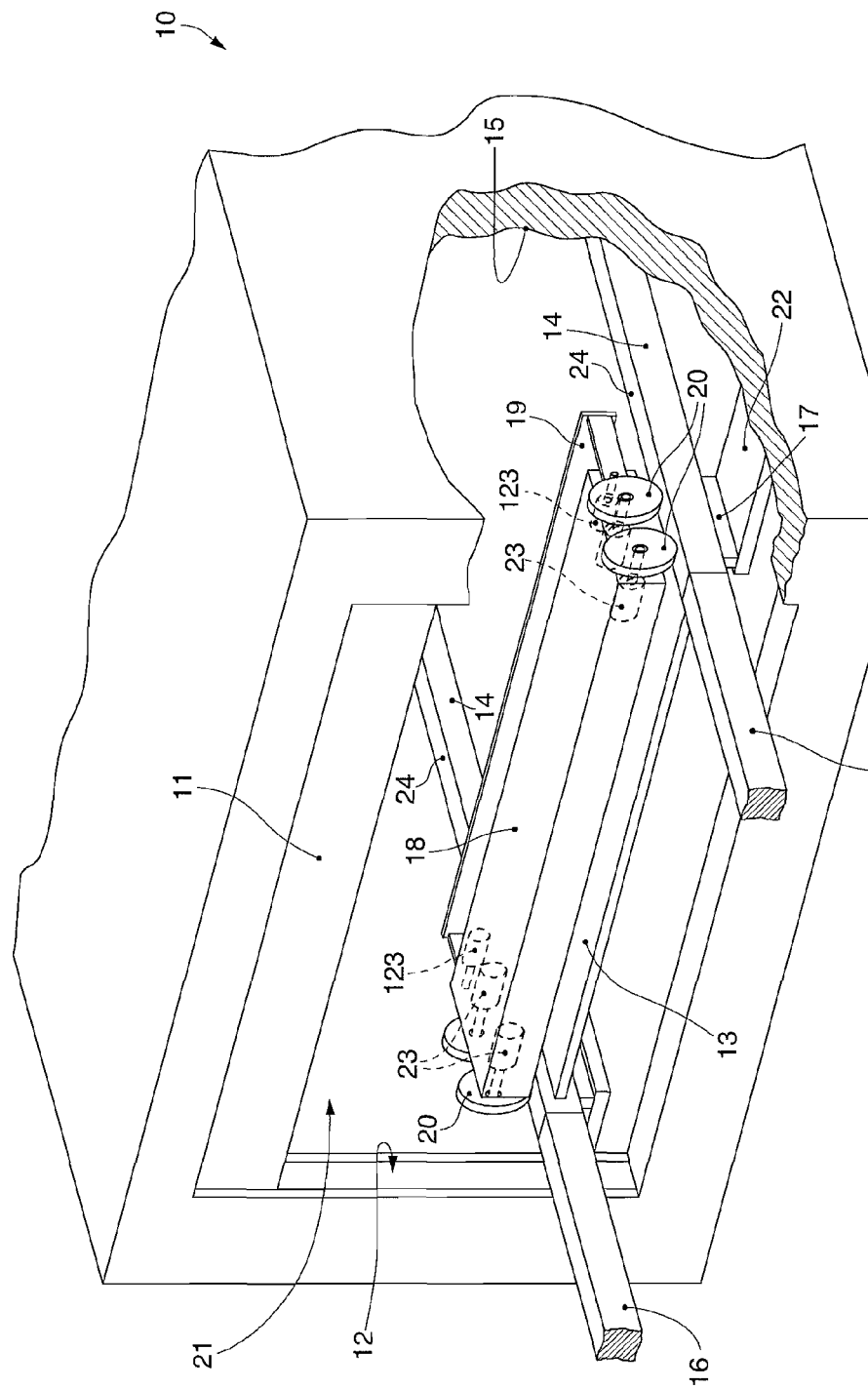
FIG. 1 is a partial perspective view of a lyophilization machine provided with a feed system according to the present invention.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME FORMS OF EMBODIMENT

We shall now refer in detail to the various forms of embodiment of the present invention, of which one or more examples are shown in the attached drawing. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

With reference to the attached drawings, an electric feed system is described, or feed means 14, 114, 214 according to the present invention. The electric feed means or system can be used to supply electric energy to a slider 18, mobile in a known manner but autonomously inside a lyophilization machine 10, and to all the internal components that need the energy and that are present in or associated with the slider 18.

Figure 10:
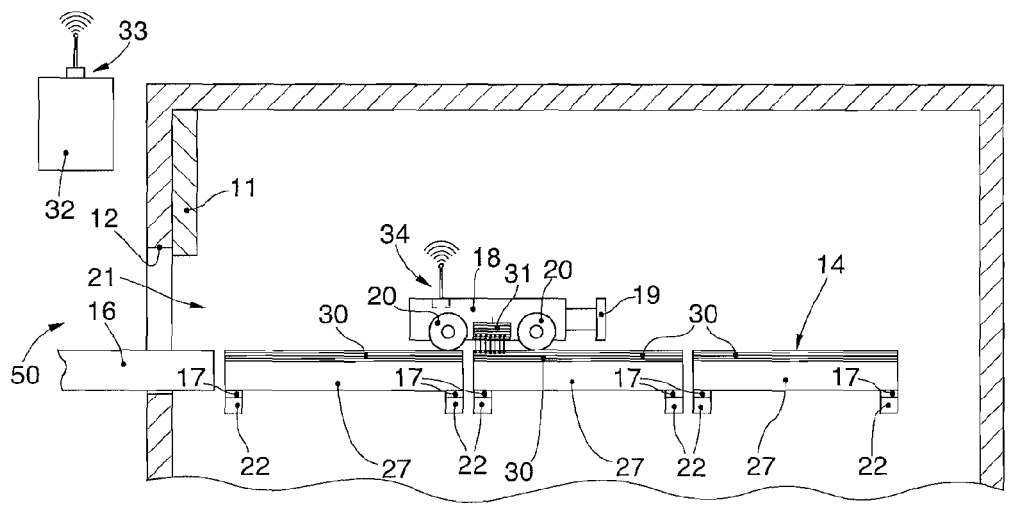
FIG. 10 is a partial lateral view of a feed system in a lyophilization machine according to other forms of embodiment.
Figure 11:
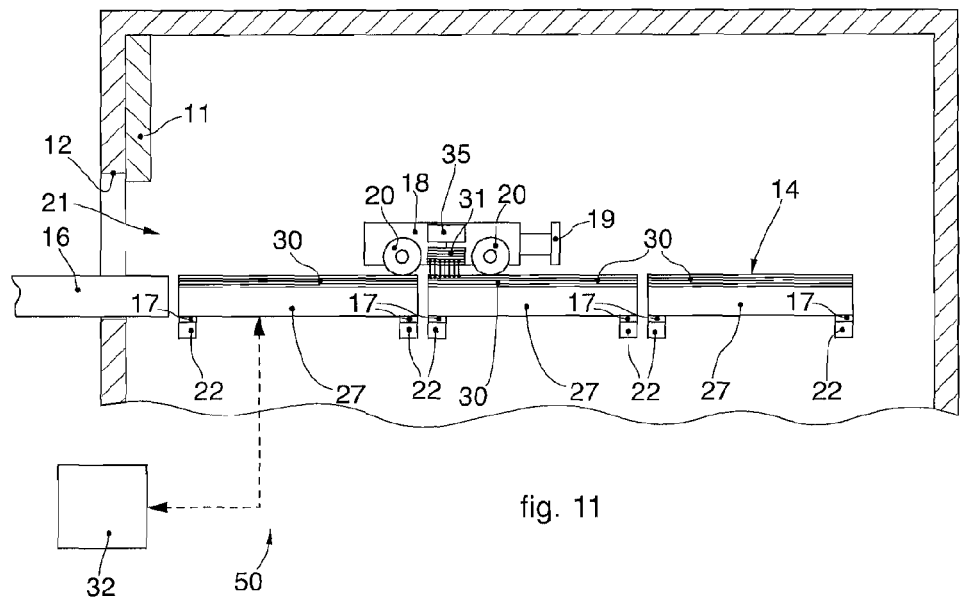
FIG. 11 is a partial lateral view of a feed system in a lyophilization machine according to yet other forms of embodiment.

It comes within the spirit of the invention to provide that pathways 14 or other means 114, 214, comprised in or constituting the feed means, can carry only the electric energy, or can also be used to convey the information connected to the functioning of the slider 18 to or from a management and control system, for example a control unit 32 (see for example FIGS. 10 and 11).

According to the present invention, the feed means 14, 114, 214 are positioned static along the path of the slider 18, at least during the loading and unloading steps of at least a loading plane 13. The feed means 14, 114, 214 can be for example movable when the lyophilization chamber 21 of the lyophilization machine 10 is substantially closed.

Figure 2:
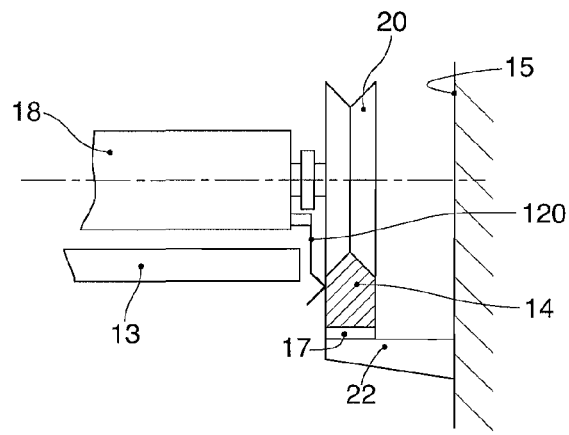
FIG. 2 is a partial lateral view of a feed system in a lyophilization machine.

According to variants described in FIGS. 1 and 2, the feed means are at least one pathway 14 of the lyophilization machine 10 along which the slider 18 is mobile.

A management and control system can also be put on board the slider 18.

Some forms of embodiment also provide that the management and control system on board the slider 18 can act in feedback with an external system through the feed means 14, 114, 214, or through another mean that also supplies electric energy.

FIG. 1 shows schematically a lyophilization machine 10 having an entrance compartment 12 that leads into a lyophilization chamber 21.

The entrance compartment 12 can be closed by a door 11. There are pathways 14 in the lyophilization chamber 21.

In the form of embodiment shown in FIG. 1, the pathways 14 are continuous, that is, they are made in a single body for the whole of their longitudinal development.

Figure 5:
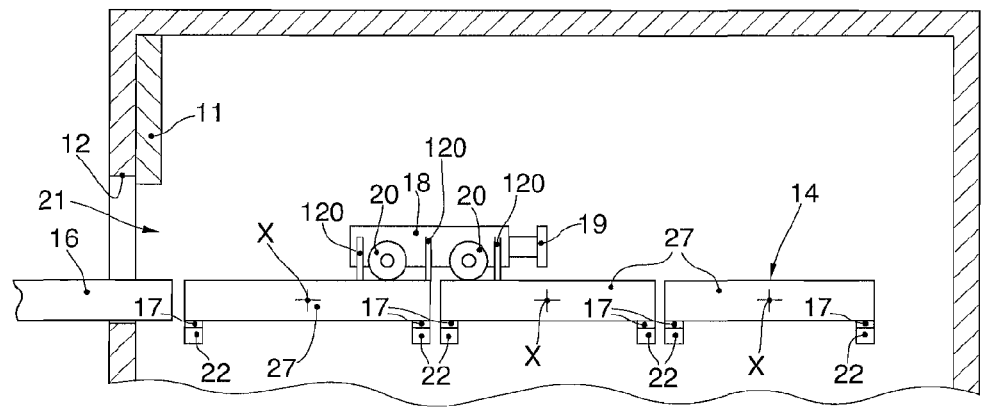
FIG. 5 is a partial lateral view of a feed system in a lyophilization machine according to one form of embodiment.

With reference to the form of embodiment in FIG. 5, the pathways 14 comprise a plurality of guide elements 27 disposed in succession to each other along a common axis of development, to define a guide for the sliding of the slider 18.

The guide elements 27 can all be the same length or a different length depending on specific requirements.

At least some of the guide elements 27 can be selectively rotatable around an axis of rotation X (FIG. 5), for example to determine the transfer of parts that could interfere with the pathway 14.

The pathways 14 can be of various types and shapes and can be supported and positioned in various ways: these aspects are irrelevant for the purposes of the inventive idea.

Some forms of embodiment, for example shown in FIG. 1, can provide that the pathways 14 rest on an insulating material 17 and are supported and maintained in position by a support 22 which can be anchored to an internal wall 15 of the lyophilization chamber 21 or other suitable mean. The support 22 can be either fixed or mobile.

When the containers are to be loaded/unloaded onto/from a loading plane 13, mobile pathways 16 are provided which from outside the lyophilization chamber 21 extend toward the inside through the entrance compartment 12 so as to connect the pathways 14.

The mobile pathways 16 can be activated for example when there is no condition of interference between the door 11 and the mobile pathways 16, that is, when the lyophilization chamber 21 is opened and/or closed.

The pathways 14 are configured to allow the slider 18 to slide. To this purpose, some forms of embodiment can provide that a plurality of wheels 20 are associated with the slider 18, at least one of which is motorized.

The wheels 20, of which there may be more than one, can be replaced by tracks or mechanical sliding blocks or by toothed wheels. In these cases the pathways 14 have suitable contrast elements mating with the wheels 20 or with the other types of movement members that can be provided.

For example, according to variants, it may be provided that the slider 18 is provided with several wheels 20 for each side of the slider 18, or in other forms of embodiment, with a toothed belt or member of a similar or equivalent type.

It also comes within the spirit of the invention to provide that the wheels 20 or the toothed belt are mounted horizontally pivoting with respect to the slider 18, to allow for example a desired positioning of the latter in the lyophilization chamber 21, in any condition whatsoever of the pathways 14.

By way of example, the wheels 20 can be fed by one or more motors 23, or by a single motor 23 having suitable shafts, transmissions and returns.

Means to reduce and/or transmit motion can also be present, such as clutches, brakes, toothed wheels, belts, chains, etc.

In the case shown here, a loading/unloading bar 19 is configured to assume one or more positions and is driven by drive members 123 in a known manner.

The feed system in FIG. 1, according to a first formulation, can provide that the feed means are the pathways 14 and that they transmit the energy through the wheels 20, which function as energy receiving means, to the slider 18.

Merely by way of example, the pathways 14 can be provided on their contact surface with the wheels 20, with one or more conductor tracks to feed energy.

When it is the wheels 20 that receive the energy, they can be insulated so as to deliver the energy to the distributor member present on board the slider 18 without creating interference, for example of the electromagnetic type.

Figure 3:
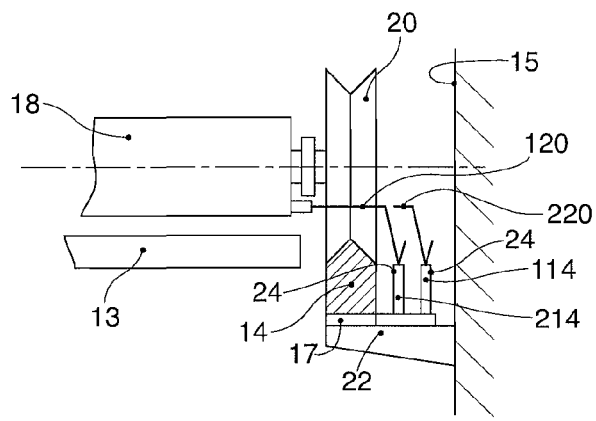
FIG. 3 is a partial lateral view of another feed system in a lyophilization machine.
Figure 4:
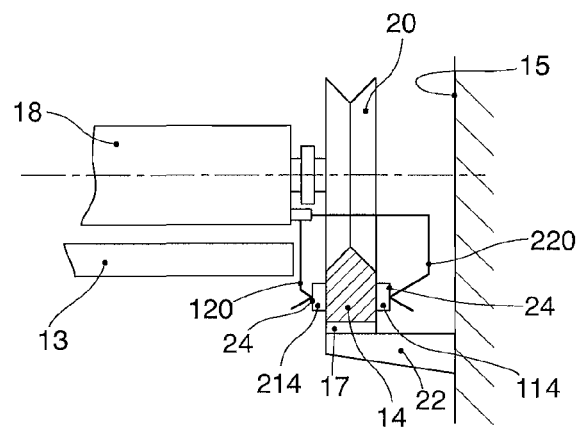
FIG. 4 is a partial lateral view of a variant feed system in a lyophilization machine.

In other forms of embodiment, as shown by way of example in FIGS. 2-4, as an alternative to the wheels 20, tracks, mechanical sliding blocks or toothed wheels, the energy can be conveyed through electrical sliding blocks 120 and/or 220, which function as receiving means.

The electrical sliding blocks 120 and/or 220 will advantageously cooperate to prevent sparking, or at least reduce it to a minimum or contain it.

The electrical sliding blocks 120 and/or 220 can slide on the pathways 14, as shown by way of example in FIG. 2, if it is the pathways 14 themselves that transport the energy conveyed through the electrical sliding blocks 120 and/or 220.

With reference to the form of embodiment in FIG. 5, two or more sliding blocks 120 and/or 220 can also be provided, to transfer the electric energy to the slider 18 and to guarantee constant feed for example when the slider 18 transits from one guide element 27 to the next. The presence of two or more blocks 120 also reduces the electric load transferred, which can cause sparks inside the lyophilization chamber 21.

According to other forms of embodiment, there may be other feed means present, other than the pathways 14.

The feed means can be for example conductor bars 114, 214, typically provided at the side of at least one pathway 14, and configured to supply energy through the electrical sliding blocks 120 and/or 220.

The feed means can run parallel to at least one pathway 14, such as, by way of example, the conductor bars 114, 214 shown in FIGS. 3 and 4.

According to other forms of embodiment, the conductor bars 114, 214 can be provided in alternate positions or configurations.

The conductor bars 114, 214 can be insulated by means of an insulation mean comprising a physical distancing or electromagnetic insulation from the pathways 14.

In the example in FIG. 3, an embodiment is shown in which two conductor bars 114 and 214 are located parallel to a pathway 14 and outside the wheel 20 that moves the slider 18.

The conductor bars 114, 214 can be electrically insulated from the pathways 14, for example interposing insulating material between the pathways 14 and the conductor bars 114, 214.

According to other forms of embodiment, the conductor bars 114, 214 can be put for example at both sides of the slider 18 and/or there can be other than two in number.

According to other forms of embodiment, the feed means can be applied on at least one side of a pathway 14, as can be seen by way of example in FIG. 4.

Still other forms of embodiment can provide a wireless energy transfer, in particular contactless. In particular, it may be provided to transmit electric energy between a source of power and an electric load that is not equipped with a source of power, in this case the movement and drive system and the correlated members on board the slider 18, without using interconnection cables.

For example, a wireless energy transfer system may be provided using "far-field" methods, which involve the use of transmissions with power rays/lasers, radio or microwaves, or "near-field" methods that use induction. Both these possibilities use electromagnetism and magnetic fields. For example, motors may be provided that use electromagnetism and magnetic fields for interaction between a first part formed by electrical coils and a second part formed by other electrical coils, or by permanent or energized magnets or by a conductor.

In specific example embodiments, the feed means can be configured as linear motors, for example linear induction motors, synchronous linear motors, brushless synchronous linear motors, homopolar linear motors, voice coil linear motors, tubular linear motors, or also piezoelectric linear motors. It is possible to use for example monolateral linear motors and bilateral linear motors.

In general, the advantages of a wireless energy transfer system, in particular contactless, can be absence of wear, absence of bulk of cables or conductors, the absence of generation of dust or dirt, the absence of potentially dangerous static loads.

Figure 6:
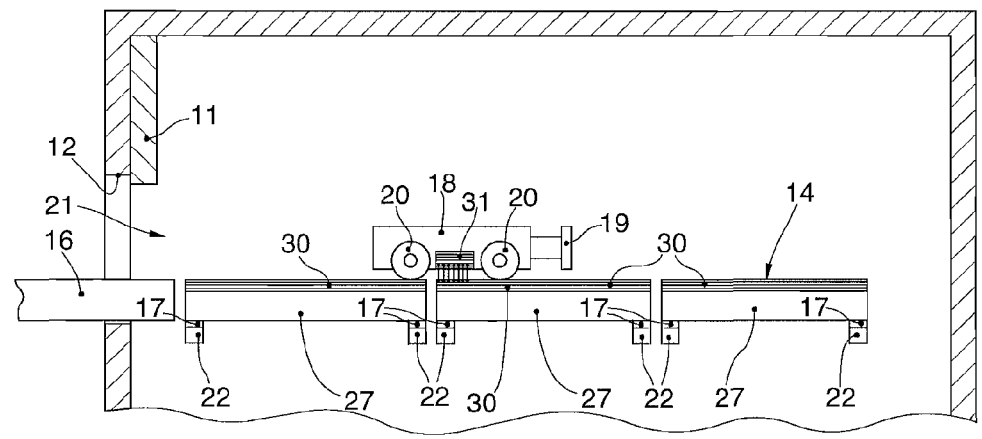
FIG. 6 is a partial lateral view of a feed system in a lyophilization machine according to one form of embodiment.

Some forms of embodiment for example shown in FIG. 6 can provide that the feed means comprise primary coils 30, or excitation coils, associated to the pathways 14 or to auxiliary paths located adjacent to the pathways 14, and fed electrically, while the receiver means comprise secondary coils 31 or induced coils, mounted on board the slider 18. The wireless energy transfer system can therefore be based on the functioning principle of the electric current transformer.

During normal functioning, the primary coils 30 generate a magnetic field suitable to excite the secondary coils 31 through magnetic induction, which in turn provide the desired electric energy to the members on board the slider 18.

In possible implementations, the secondary coils 31 can be disposed in a containing shell 36, which can be connected to or mounted on the slider 18, being positioned for example above or at the side of the pathway 14.

In other possible implementations, the secondary coils 31 can be integrated or incorporated with the wheels 20 of the slider 18.

In possible implementations, the primary coils 30 and/or the secondary coils 31 can be circular in shape, or oblong or elongated, or polygonal. For example, the secondary coils 31, suitably configured and shaped, can be integrated in the wheels 20 of the slider 18.

Figure 7:
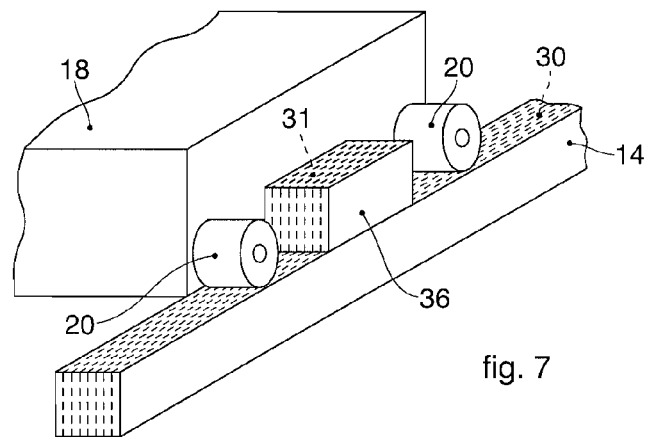
FIG. 7 is a schematic view of forms of embodiment of a feed system according to the present description.
Figure 8:
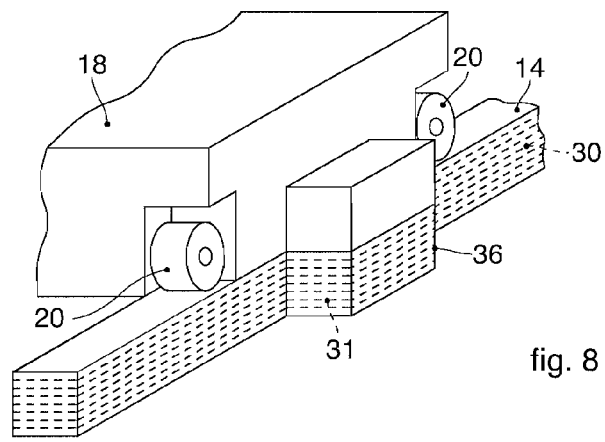
FIG. 8 is a schematic view of further forms of embodiment of a feed system according to the present description.
Figure 9:
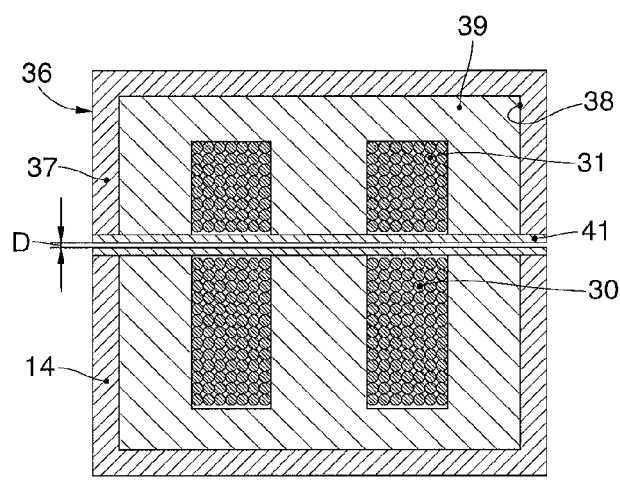
FIG. 9 is a schematic view in detail of further forms of embodiment of a feed system according to the present description.

FIGS. 7, 8 and 9 are used to describe other possible forms of embodiment, which can be combined with all the forms of embodiment described here, of a wireless energy transmission system in which the feed means comprise the primary coils 30 and the secondary coils 31. For example, the latter can be housed in a suitable containing shell 36, which can be disposed separate or distanced from the pathway 14, that is, it can be contactless, in particular at a distance "D" comprised between 1.5 mm and 12 mm (FIG. 9). In particular, with reference to FIG. 7, the secondary coils 31 can be provided above the pathway 14, for example housed in the containing shell 36, which can be provided to slide at the upper part along the pathway 14. On the contrary, with reference to FIG. 8, the secondary coils 31 can be provided at the side of the pathway 14, for example housed in the containing shell 36 provided to slide, in this case, laterally along the pathway 14.

FIG. 9 is used to describe possible forms of embodiment, which can be combined with all the forms of embodiment described here, of the containing shell 36, which can comprise a box 37 defining a containing chamber 38 inside which the secondary coils 31 are housed, for example associated with a ferromagnetic core 39. The box 37 can be closed by a wall 41, which can face toward the pathways 14. The wall 41 can be made of steel, in particular stainless steel. Furthermore, the wall 41 can be amagnetic. This can be advantageous to prevent dust or dirt from depositing. For example, amagnetic steel can be used, for example series AISI 300 steel. The wall 41 can also have a thickness comprised between 0.5 mm and 3.0 mm, in particular between 0.6 mm and 2.5 mm, more particularly between 0.7 mm and 2.0 mm. For example, the wall 41 can be a foil, in particular a foil of amagnetic steel. According to some forms of embodiment, it is provided that when the door 11 of the lyophilization machine 10 is closed, the energy supplied by the feed means 14 is interrupted.

This configuration can be obtained, for example, by releasing the mobile pathways 16 as described above, thus interrupting the electrical continuity between them and the pathways 14, if it is the latter that transport the energy.

According to other variants, the interruption of the energy transport, in concurrence with the closing of the door 11, can be obtained in different ways, for example using electric switches or separators that can for example be driven by the door 11 itself.

According to some forms of embodiment, the feed means 14, 114, 214 can have any conformation whatsoever that has a reduced flat horizontal surface 24, see examples in FIGS. 1, 3 and 4, to prevent dust from forming or depositing.

It is clear that modifications and/or additions of parts may be made to the feed system in a lyophilization machine for the pharmaceutical sector as described heretofore, without departing from the field and scope of the present invention.

FIGS. 10 and 11 are used to describe forms of embodiment, which can be combined with all the forms of embodiment described here, in which a communication system 50 can be provided, configured for the two-way reception and transmission of data or information with the slider 18.

The communication system 50 can be at least partly fed by the feed means 14, 114, 214, 30, in particular with regard to the components or devices of the communication system 50 that are mounted on board or associated with the slider 18. For example, in the possible implementations described above in which the feed means are formed by a wireless energy transfer system, the system can supply energy to the slider for the functioning of the communication system 50, in particular for the purposes of the two-way dialog between control unit 32 and slider 18.

In particular, the communication system 50 can be provided for the advantageously two-way dialog between a control unit 32, which can be outside, and the slider 18, for the purposes of transmitting data, for example data used to control and regulate the functioning of the slider 18.

According to possible implementations, the communication system 50 can be a wireless communication system. By the expression "wireless communication" we mean the transfer of data or information between two or more points which are not connected to each other by an electrical conductor. Normally, the wireless communication is carried out in an electromagnetic spectrum that goes from about 9 kHz to about 300 GHZ. One example of wireless communication is radio communication, or other electromagnetic wireless technologies are possible, like the use of magnetic, electric, induced electromagnetic fields (for example as in the case of short range RFID tags) or light (Free-space optical, FSO, for example visible or IR), or it is also possible to use sound.

According to possible implementations, the communication system 50 can be configured wireless, for example by radio transmission-reception, short-wave, medium-wave or long-wave, for example by Wi-Fi protocol or Bluetooth® protocol, or Zigbee, or NFC protocol (Near Field Communication), or infrared communication (for example Infrared Data Association, IrDA).

In particular, in forms of embodiment described using FIG. 10 by way of example, which can be combined with all the forms of embodiment described using FIGS. 1-9, the communication system 50 can comprise a first wireless transceiver device 33, for example an antenna, which can be provided associated with the external control unit 32, for example integrated, incorporated or connected externally thereto. Furthermore, the communication system 50 can comprise a second wireless transceiver device 34, for example an antenna, which can be provided associated with the slider 18, for example integrated, incorporated or connected externally thereto. One possible example embodiment may provide that the first wireless transceiver device 33 and the second wireless transceiver device 34 are Wi-Fi antennas. The second wireless transceiver device 34 can be fed by the feed means 14, 114, 214, 30.

In other possible forms of embodiment, which can be combined for example with all the forms of embodiment described using FIGS. 1-5, the communication system 50 can exploit the electrical connection supplied by the feed means 14, 114, 214, for the transmission of data. In particular, the communication system 50 can exploit the transmission of data through electrical signals, for example by conveyed wave technology, or power line communications (PLC), in particular for example implemented with LonWorks technology. In particular, the use of PLC technology can provide to superimpose a telecommunication signal at high frequency and low amplitude over a high-tension feed signal used to distribute the electrical power, or network signal. The PLC technology can also provide to use transceivers configured to reconstruct the information transmitted by filtering the feed signal and processing the telecommunication signal.

According to other possible implementations, the communication system 50 can be configured wireless for transmission-reception via induced magnetic field. In particular, the communication system 50 can be configured to convey from the control unit 34 the data or information connected to the functioning of the slider 18.

According to some forms of embodiment, the communication system 50 can be integrated with the feed means comprising the primary coils 30 and the secondary coils 31 described using FIG. 6. In particular, in forms of embodiment described using FIG. 11, the communication system 50 can provide that the external control unit 32 is connected to the pathways 14 or to auxiliary paths located adjacent to the pathways 14, to which the primary coils 30 are associated.

The external control unit 32 in particular can be configured to transmit-receive an electrical signal that carries information or data from/to the primary coils 30. The magnetic field induced by/on the excited primary coils 30 can carry the information or data arriving from the secondary coils 31 or from the control unit 32, depending on the direction of the communication which, as we said, is advantageously two-way. The magnetic field induced by/on the excited primary coils 30 generates an electric current induced respectively on the secondary coils 31 or toward the control unit 32, which will therefore carry the control and functioning information or data of the slider 18, advantageously in two-way mode.

According to possible implementations, the communication system 50 can comprise a modulator/demodulator device or encoder 35, configured to cooperate with the secondary coils 31 and to manage the electrical signal from or to the slider 18.

The modulator/demodulator device or encoder 35 can recognize and interpret variations in the electromagnetic field associated with the secondary coils 31, for example in amplitude, frequency or power, and can also, possibly, encode the variations in amplitude, frequency or power of the same electromagnetic field in order to associate them to the information or data to be transmitted-received. The modulator/demodulator device or encoder 35 can be fed by the feed means 14, 114, 214, 30.

According to some forms of embodiment, the slider 18 can be provided on board with its own energy accumulation means, for example an accumulator or battery, advantageously the rechargeable type. The energy accumulation means can be used for example to feed the communication components of the communication system 50 mounted on or associated with the slider 18, and also to supply energy to possible movement components of the slider 18.

It is also clear that, although the present invention has been described with reference to some specific examples, a person of skill in the art shall certainly be able to achieve many other equivalent forms of feed system in a lyophilization for the pharmaceutical sector, having the characteristics as set forth in the claims and hence all coming within the field of protection defined thereby.

The invention claimed is:

1. Feed system for a lyophilization machine comprising: energy feed means placed inside a lyophilization chamber,
a slider autonomously mobile energy receiver means mounted on the slider, wherein said energy feed means are stationary along the pathway of the slider and wirelessly supply electric energy to the energy receiver means in order to move the slider, the energy feed means being selectively activated at least during the loading and unloading of a loading plane and wherein the feed system further comprises a communication system configured for a two-way transmission and reception of data or information with the energy receiver means, the energy feed means arranged to supply energy to the communication system.

2. Feed system as in claim 1, wherein the energy feed means comprise the pathway.

3. Feed system as in claim 1, wherein at least a portion of the energy feed means is associated with the pathway.

4. Feed system as in claim 3, wherein at least the portion of the energy feed means is insulated from the pathway.

5. Feed system as in claim 1, wherein at least a portion of the energy feed means is disposed parallel to the pathway.

6. Feed system as in claim 1, wherein the energy feed means comprise primary coils able to be electrically fed and associated to at least one pathway present inside the lyophilization chamber, and wherein the energy receiver means comprise secondary coils mounted on the slider and configured to generate energy from the magnetic induction of said primary coils.

7. Feed system as in claim 1, wherein the energy receiver means are configured to transmit electric energy from the energy feed means to components located on the slider.

8. Feed system as in claim 7, wherein the energy receiver means are chosen from a group comprising wheels, toothed wheels, tracks, mechanical sliding blocks or electrical sliding blocks.

9. Feed system as in claim 1, wherein the lyophilization chamber includes a door, and wherein the energy feed means are configured to be without energy at least the door is closing.

10. Feed system as in claim 9, wherein the energy feed means are configured to interrupt an electric energy feed through a release of mobile pathways.

11. Feed system as in claim 9, wherein electric switches or separators are configured to interrupt the electric energy feed of said energy feed means.

12. Feed system as in claim 1, wherein the energy feed means have a limited horizontal flat surface.

13. Feed system as in claim 1, wherein the energy feed means are configured to convey instructions using the communication system, to a management and control system present in the slider and operating in association at least with the lyophilization chamber.

14. Feed system as in claim 13, wherein the management and control system located on board said slider is configured to act in feedback at least with an external command and control unit through at least a portion of the energy feed means.

15. Lyophilization machine comprising a lyophilization chamber with a slider autonomously mobile along a pathway within the lyophilization chamber in order to load and unload a loading plane, and a feed system provided with energy feed means placed inside the lyophilization chamber, and energy receiver means mounted on the slider, wherein the energy feed means are stationary relative to the pathway of the slider and wirelessly supply electric energy to the energy receiver means in order to move the slider, the energy feed means being selectively activated at least during loading and unloading of the loading plane, and wherein the energy feed system further comprises a communication system configured for a two-way transmission and reception of data or information with the energy receiver means, the energy feed means supplying energy to the communication system.

16. Slider comprising internal movement components, the internal movement components of the slider configured to be mobile inside a lyophilization chamber and to be fed by a feed system provided with energy feed means, wherein the energy feed means are positioned so as to be static relative to a travel pathway of the slider, the slider further comprising energy receiver means cooperating with the energy feed means and being associated with a wireless communication system configured for two-way transmission and reception of data or information with the slider and at least partially fed by the energy feed means.

17. Slider as in claim 16, wherein the slider is configured to be driven and/or coordinated with instructions of an external command and control unit by means of signals transported by the energy feed means.

18. Feed system as in claim 1, wherein the communication system is a wireless communication system.

* * * * *